Figure 1:
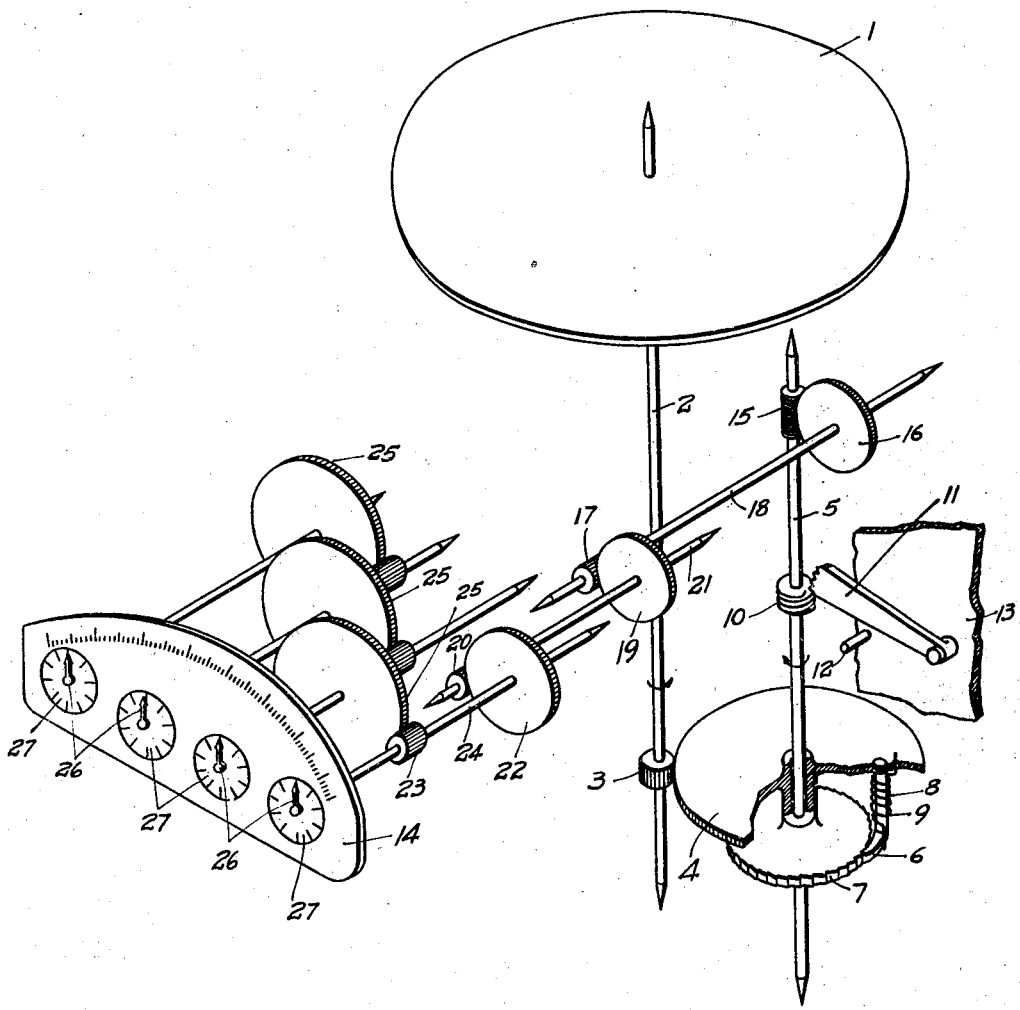

Feb. 2, 1932.  L. C. BLEVINS  1,843,538
WATTHOUR METER RATCHET
Filed Jan. 18, 1929

INVENTOR
Leonard C. Blevins.
BY
Wesley L. Carr
ATTORNEY

Patented Feb. 2, 1932

1,843,538

UNITED STATES PATENT OFFICE

LEONARD C. BLEVINS, OF EAST ORANGE, NEW JERSEY, ASSIGNOR TO WESTINGHOUSE ELECTRIC & MANUFACTURING COMPANY, A CORPORATION OF PENNSYLVANIA

WATTHOUR METER RATCHET

Application filed January 18, 1929. Serial No. 333,340.

My invention relates to electrical measuring instruments and more particularly to mechanism for controlling the indicating mechanism of watthour and maximum-demand meters.

My invention resides in a device permitting movement of the indicating pointers of watthour meters and the like in one direction only, regardless of the direction of rotation of the watthour-meter disc, and it is characteristic of my invention that the watthour-meter disc is rotatable in either direction without being affected to any considerable degree, by said device.

It is further characteristic of my invention that a relatively few simple, additional parts are necessary to be added to a watt-hour meter, or the like, of the usual type, in order that the latter shall have combined therewith all of the desirable features of my invention.

My invention is not, strictly speaking, limited to electrical measuring instruments but is pertinent to any combination, comprising as set forth in the appended claims, a member rotatable in any direction, a second member, means for driving said second member with said first member upon one direction of rotation thereof and means for discontinuing movement of said second member without affecting said first member.

My invention resides in the apparatus hereinafter described and claimed, the foregoing and further characteristics of my invention being determinable from the following description.

For an illustration of a form my apparatus may take, reference is to be had to the accompanying drawing in which, The single figure is an elementary perspective view of a portion of a watthour meter having associated therewith a device constructed in accordance with my invention.

Referring to the drawing, a watthour-meter disc 1 is mounted, in the usual manner, to turn, in accordance with the magnitude of power traversing an electrical circuit (not shown) and thus drive a shaft 2 in a usual and well known manner. A pinion 3 is mounted on the shaft 2 to drive a gear wheel 4, in accordance with the rotation of the shaft 2.

The gear wheel 4 is rotatably journalled on a shaft 5 and carries a pawl 6 that cooperates with a ratchet wheel 7 secured to the shaft 5. As shown in the drawing, upon clockwise rotation of the gear wheel 4, the pawl 6 engages the teeth of the ratchet wheel 7 and rotates the latter and the shaft 5 in the same direction. However, when the gear wheel 4 rotates in a counter-clockwise direction, the pawl 6 will tend to ride over the teeth of the ratchet wheel 7 without turning it or the shaft 5.

Since the meter mechanism, as shown and described in the particular application of my invention, is of a very delicate character, it becomes necessary to employ a device designed to overcome the effect of friction of the pawl 6 on the ratchet wheel 7 which is sometimes sufficient to rotate the shaft 5 in a counter-clockwise direction upon reversal of the normal rotation of the meter disc 1.

The ratchet-and-pawl mechanisms may be associated with the shaft 5 and the wheel 4 in any well known manner. For example, the pawl 6 may be mounted, as shown in the drawing, on a projection 8 that is secured to the gear wheel 4 and is biased into engagement with the ratchet wheel 7 by a helical spring 9, or the like, secured, at one end, to the gear wheel 4, and, at the other end, to the pawl 6.

The device employed in my invention to overcome the friction of the pawl 6 upon the ratchet wheel 7 is described as follows.

A worm pinion 10 is secured to the shaft 5 to cooperate with a gear sector 11 and a motion-limiting member 12 that are mounted on a portion 13 of the frame of the meter to prevent the shaft 5 from turning, in the example shown, in a counter-clockwise direction. When the shaft 5 rotates in a clockwise direction, the gear sector 11 rides freely upon the top of the worm pinion 10, producing a negligible amount of energy loss due to friction. However, if, upon reversal of power or for any other reason, the shaft 5 rotates the worm pinion 10 in a counter-clockwise direction, the latter engages the gear sector 11 and moves it downward until further motion thereof is prevented by the motion-limiting member 12. When the gear sector 11 engages the member 12, rotation of the shaft 5 in a counter-clockwise direction is stopped and the pawl 6 rides freely over the teeth of the ratchet wheel 7, thereby permitting the disc 1 to rotate in a counter-clockwise direction.

The shaft 5 actuates an integrating mechanism 14, in the usual and well known manner, through worm pinion 15 mounted on the shaft 5, gear wheels 16 and 17 mounted on a shaft 18, gear wheel 19 and pinion 20 mounted on a shaft 21 and gear wheel 22 and pinion 23 mounted on a shaft 24. Pinion 23 drives the gear train 25 of the registering mechanism 14 which is provided with the usual integrating pointers and dials 26 and 27, respectively.

A ratchet device, constructed in accordance with my invention, as indicated above, permits the disc 1 to rotate backwards upon reversal of power in its energizing coils without affecting the registering mechanism 14 of the meter, such operation improving the accuracy of the reading of the recording dials and causing the latter to indicate the true amount of power traversing the instrument in one given direction.

As pointed out in the preliminary description contained herein, a particularly desirable feature of the device constructed in accordance with my invention resides in the small amount of friction necessary to operate the device when the disc 1 is turning in one direction, that is, the friction is limited to that caused by the weight of the sector 11 riding on the worm pinion 10. This friction, in addition to being of a very small magnitude, is constant, thereby introducing a factor that may be properly taken into consideration when calibrating the meter so that the accuracy of the latter is substantially unaffected.

Various modifications may be made in my invention without departing from the spirit and scope thereof, as set forth in the appended claims.

I claim as my invention:

1. In combination, a member rotatable in a plurality of directions, a second member, means for driving said second member by said first member when the latter rotates in one direction, and means including a worm pinion for discontinuing movement of said second member without affecting said first member when the latter rotates in another direction of rotation.

2. In combination, a member rotatable in a plurality of directions, a second member, means for driving said second member by said first member when the latter rotates in one direction, and means including a worm gear and stop for discontinuing movement of said second member without affecting said first member when the latter rotates in another direction.

3. In combination, a member rotatable in a plurality of directions, a second member, means for driving said second member by said first member when the latter rotates in one direction, and ratchet and pawl means including a worm gear and sector stop for discontinuing movement of said second member without affecting said first member when the latter rotates in another direction.

4. In combination, a member rotatable in a plurality of directions, a second member, means for driving said second member by said first member when the latter rotates in one direction, and ratchet and pawl means including a worm gear and sector stop mounted on said second member for discontinuing movement of said second member without affecting said first member when the latter rotates in another direction.

5. In combination, a meter disc rotatable in a plurality of directions, a member, means for driving said member by said disc when the latter rotates in one direction, and means including a worm gear and stop for discontinuing movement of said member without affecting the rotation of said disc.

6. In combination, a meter disc rotatable in a plurality of directions, a member, means for driving said member by said disc when the latter rotates in one direction, and means including a pawl driven by said disc, a ratchet wheel mounted on said member and driven by said pawl, a worm pinion secured to said member and a sector co-operating with said worm pinion for discontinuing movement of said member without affecting the rotation of said disc.

7. A device for limiting the direction of rotation of a member comprising means including ratchet and pawl mechanism for turning said member in one direction only, and means including a worm and sector stop for limiting the rotation of said member.

8. A device for limiting the direction of rotation of a member comprising a wheel rotationally mounted on said member, a ratchet wheel secured to said member, a pawl secured to said wheel for turning said ratchet wheel, and means including a worm gear, a gear segment and a stop member, for permitting rotation of said shaft in one direction only.

9. A device for limiting the direction of rotation of a member comprising a pawl rotationally mounted on said member, a ratchet wheel secured to said member and turnable in one direction by said pawl and means including a worm pinion mounted on said member and a gear sector co-operating with said worm for permitting rotation of said shaft in one direction only.

10. In a watthour meter, the combination with a worm gear and sector stop for preventing rotation of the indicating pointers in one direction.

In testimony whereof, I have hereunto subscribed my name this 9th day of January, 1929.

LEONARD C. BLEVINS.